April 23, 1957 G. W. SCHAUER, JR 2,790,057
DOMESTIC APPLIANCE
Filed Nov. 1, 1954

INVENTOR.
George W. Schauer Jr.
BY R. K. Candor
His Attorney

United States Patent Office 2,790,057
Patented Apr. 23, 1957

2,790,057

DOMESTIC APPLIANCE

George W. Schauer, Jr., Dayton, Ohio, assignor to General Motors Corporation, Detroit, Mich., a corporation of Delaware Application November 1, 1954, Serial No. 466,026

5 Claims. (Cl. 219—20)

This invention relates to a domestic appliance and more particularly to an improved thermostatic control of the surface heaters of domestic electric ranges.

A wide variety of food preparation is performed on the surface heaters of domestic ranges. This includes warming, simmering, boiling, low temperature frying and French or deep fat frying. These operations are normally performed by first heating the vessel at the maximum heating input; then, to prevent overheating, the heating input should be lowered to a value which will properly maintain the cooking operation after the food has reached the desired temperature. Frequent attention by the operator is necessary to insure satisfactory heating, as failure to lower the heating input at the proper time or to a rate sufficiently reduced for continuous cooking or heating may cause scorching or burning or a less satisfactory taste, or other unsatisfactory conditions.

It is an initial object of this invention to provide a temperature control for range surface units which provides satisfactory control of utensil temperatures which may be preselected from a low warming temperature such as 150° F. up through boiling or steaming range and on up through desirable frying temperature that is 250° to 375° F. and even into the higher temperature required for deep fat cooking that is 375° to 450° F.

It is an object of this invention to provide a practical inexpensive form of automatic temperature control for surface heaters providing fast initial heating until a selected temperature is reached after which heating is continued at reduced rates continued as long as the temperature remains within a predetermined temperature increment above the selected temperature.

It is another object of this invention to provide an adjustment for such a temperature control which will provide a lower reduced rate in the lower portion of the temperature adjustment and a higher reduced rate in the upper portion of the temperature adjustment.

This is accomplished by using a hydraulic type of temperature sensing bulb located in the center of the heating unit which actuates a remotely located diaphragm operating two separate electrical contacts at a fixed temperature differential between the two. The first set of electrical contacts deenergizes one circuit of a two circuit surface heater. The second circuit includes a pulsing switch which continuously opens and closes the switch to reduce the wattage. The temperature adjusting apparatus for the bellows on the diaphragm includes a cam operated switch mechanism which shunts the pulsing switch in the upper portion of the temperature range.

By this arrangement the knob is turned to adjust the diaphragm to open the first switch at whatever temperature may be selected such for example 200° F. Before this temperature is attained two circuits of the heater may be energized. If the knob is set for the lower portion of the temperature range the heat in one of the circuits will be reduced by the pulsing switch. If a knob is set for the upper portion of the temperature range, the pulsing switch is shunted allowing this circuit to operate at full capacity.

When the utensil attains the opening temperature of the first switch, one of the circuits is deenergized. The remaining circuit remains energized either with the pulsing switch in or out of the circuit according to whether the temperature adjusting knob is in the low or high temperature range. Should the temperature of the utensil rise more than a certain amount above the opening temperature of the first switch such as 250° F. the second switch will be opened by the diaphragm to completely deenergize all circuits of the heater.

Further object and advantages of the present invention will be apparent from the following description, reference being had to the accompanying drawings wherein a preferred form of the invention is clearly shown.

Figure 1:
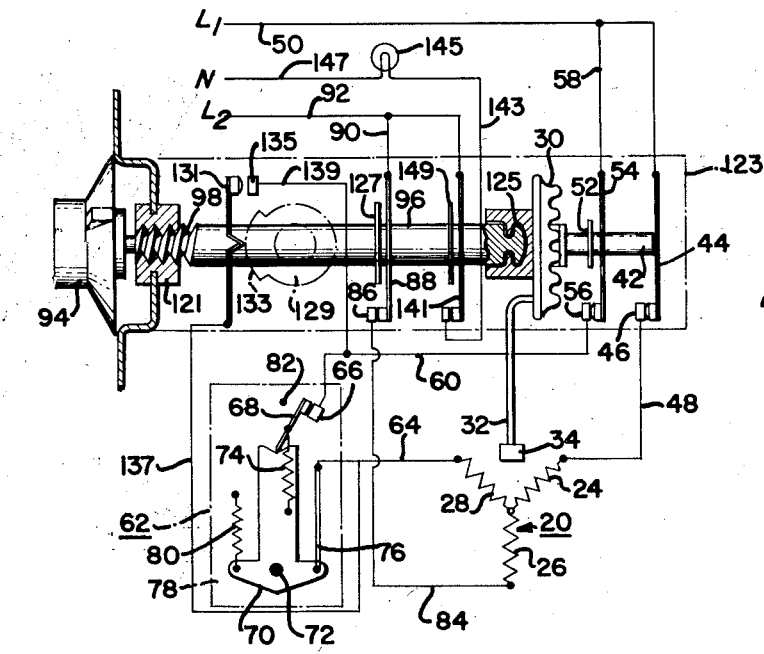
Figure 1 is a diagrammatic view of a surface heater and a control system employing one form of my invention.
Figure 2:
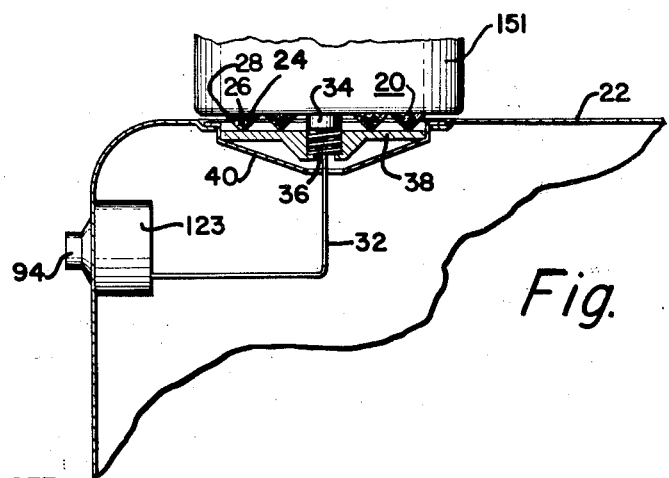
Figure 2 is a vertical sectional view partly diagrammatic of the top portion of an electric range showing the application of my invention to a surface heater.
Figure 3:
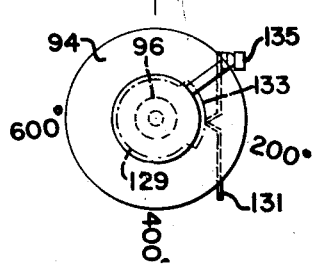
Figure 3 is a fragmentary view showing the knob of a switch controlled by the knob.

Referring now to the drawings and more particularly to Figures 1 and 2 there is shown a three section surface heater 20 for the top 22 of an electric range. This surface heater may be of the tubular sheath type wound into the form of a spiral and containing three heater sections extending in parallel within the sheath which is triangularly in cross section. The heater may be of the type shown in the Tuttle Patent No. 2,508,552, issued May 30, 1950. The three sections 24, 26 and 28 have one end each connected to a common junction forming a Y arrangement. The sections may have any suitable value but I prefer to proportion the sections so that the section 26 has a resistance of about one-fourth the resistance of the section 24 and between one-fifth and one-sixth the resistance of the section 28. For example, the section 26 may have a resistance of eight ohms and section 24 may have a resistance of 33 ohms and the section 28 may have a resistance of 44 ohms.

The primary control of this surface heater 20 is provided by a two step thermostat which includes a hydraulic system having a hydraulic diaphragm 30 connected by a capillary tube 32 to a spring mounted thermostat bulb 34 mounted in the center of the heater 20 as shown in Figure 2. The thermostat bulb 34 is spring pressed upwardly by the spring 36 supported by the heater support 38. The heater support 38 is supported by the drip pan 40 through which extends the capillary tube 32.

The diaphragm 30 includes a follower 42 which is adapted at the selected temperature to open a movable switch contact 44 away from the cooperating stationary contact 46. This stationary contact 46 is connected by the conductor 48 to the second or free end of the heater section 24. The movable contact 44 is connected to the first supply conductor 50. The diaphragm 30 is provided with a second follower 52 adapted to engage a second movable switch member 54 at a constant increment above the temperature at which the movable switch contact 44 is opened such as 25° F. This movable switch contact 54 cooperates with a stationary switch contact 56. The movable switch contact 54 is connected by the conductor 58 to the first supply conductor 50. The switch contact 56 is connected by the conductors 60 through a pulsing type switch 62 and the conductor 64 to the second or free end of the heater section 28.

This pulsing switch 62 may be of any suitable type but preferably it is of the series connected hot wire type shown in the Werner Patent No. 2,242,769 issued May 20, 1941. In this particular application however the parts of the switch in said patent designated by the reference characters 51*b*, 60*b*, 57*b*, 64*b*, 30 and 65*b* are omitted. Such a switch is shown diagrammatically herein including a stationary switch contact 66 connected to the conductor 60. A toggle contact 68 is mounted upon the end of a lever 70 which is pivotally mounted upon an insulated pivot pin 72. A toggle spring 74 connects the toggle switch 68 to the lever 70. The lever 70 is connected to a wire 76 having substantially the same rate of thermal expansion as the base or frame 78 of the relay or pulsing switch 62. The opposite end of this hot wire 76 is anchored to the base or frame 78 and connected to the conductor 64. A tension type coil spring 80 maintains a tension upon the wire 76 by urging the lever 70 in a clockwise direction about its insulated pivot 72.

When the relay 62 is cold, the switch members 68 and 66 will be continuously closed as shown in Figure 1. However when current flows through the relay 62 from the conductor 60 to the conductor 64, the wire 76 will be heated and will elongate permitting the spring 80 to turn the lever 70 about its insulated pivot pin 72 to move the movable switch member 68 away from the stationary contact into contact with a stop 82 to open the circuit between the conductors 60 and 64. The switch member 68 will remain in the open position until the wire 76 cools sufficiently to contract and move the lever 70 in a counterclockwise direction to move the toggle switch 68 back to the closed position shown in Figure 1. This relay may be adjusted or set to provide any desired proportion of closed time to open time. For this particular circuit I prefer to set the control to provide a proportion of 25% closed time and 75% open time.

The second end of the third section 26 is connected by the conductor 84 to the stationary contact 86 of the off-on switch 88 connected by the conductors 90 and 92 to the second supply conductor. This switch 88 remains closed in all positions excepting the off position of the temperature control knob 94. The temperature control knob 94 is mounted at the front of the range top as shown in Figure 2 upon the front end of a shaft 96 having a left-hand threaded portion 98 provided with a fast thread which is threaded into a stationary nut 121 fixed to a stationary part of the control housing 123. The opposite end of this shaft is provided with a bearing portion 125 which adjusts the mounting of the diaphragm 30 so as to move the diaphragm 30 away from the switch members 44 and 54 when the knob 94 is moved from the off position to the highest position. The axial movement of the shaft 96 causes a follower 127 to engage and open the switch member 88 in the off position.

The shaft 96 also is provided with a rotary cam 129 which operates a movable switch member 131 to open position when the knob 94 and the shaft 96 is between off and the position at which the switch 44 is opened when the thermostat bulb 34 reaches a temperature of about 200° F. For this purpose the cam 129 is provided with the raised portion 133 extending through an arc correlated with this section of the knob and shaft position to keep the movable switch member 131 away from the stationary contact 135 through this portion of the range of movement. The movable contact 131 is connected by the conductor 137 to the conductor 64 while the stationary contact 135 is connected by the conductor 139 to the conductor 60. When the knob 94 is turned to the portion of the range above 200° F. the low portion of the cam 129 is presented to the movable switch member 131 allowing the switch member 131 to engage the contact 135 to shunt the pulsing switch 62.

There also is provided a second movable on-off switch 141 connected to the supply conductor 92 which engages a stationary conact connected to the conductor 143. This conductor 143 connects to a pilot lamp 145 which in turn is connected to the neutral supply conductor 147. The switch 141 is opened in the off position of the knob 94 by the follower 149 to extinguish the pilot light 145 to indicate that the surface heater 20 is deenergized.

This control system is arranged so that if it is desired to heat the utensil 151 upon the surface heater 20 to a slow boil or to any temperature below, the knob 94 is turned from the off position to any selected temperature up to about 195° F. During the initial warm up period before the selected temperature is reached, the position of the knob 94 and the shaft 96 will cause the movable contacts 88, 141, 54 and 44 to be closed. This will establish one circuit from the conductor 50 through the switch 44 and conductor 48, the heater sections 24 and 26, the conductor 84, the switch 88, and the conductors 90 and 92 to provide a heating effect of substantially 1355 watts when the supply voltage is 236 volts. A second circuit is established from the supply conductor 50 through the conductor 58, the switch 54, the conductor 60, the switch members 66 and 68, the lever 70, the thermal wire 76, the conductor 64, and heater sections 28 and 26, the conductor 84, the switch 88, and the conductor 90 to the supply conductor 92. Since the pulsing relay switch 62 will only be closed 25% of the time this will provide a heating circuit of one-fourth of its maximum wattage of 1070 watts which is only 266 watts. The total wattage for the preheating at temperatures of 195° and below is the sum of the two heats amounting to 1580 watts, approximately.

When the selected temperature such as 195° F. is reached, the diaphragm 30 expands efficiently to open the first step switch 44 to disconnect the first circuit and causing the heating to continue on the second circuit alone supplying only 266 watts. This is sufficient for warming and low boiling operations. The heating will continue on the second circuit alone until either the temperature of the utensil 155 exceeds the opening temperature for the second step switch 54 which is 25° above the opening temperature of the first step switch 44. In this event the entire heater 20 will be deenergized until the temperature falls below the closing temperature of the second step switch 54. If the temperature of the utensil 151 should fall below the closing temperature of the first step switch 44 then the preheat circuit will be reconnected. If it is desired to fast boil, the knob 94 is turned to a temperature of 205° F. If it is desired to fry, the knob 94 is turned to suitable frying temperatures above 205° F. In either of these positions, the cam 129 will be turned to present a low portion to the follower of the switch member 131 causing it to engage the stationary contact 135. This closes a shunt provided by the conductors 139, the contacts 135 and 131 and the conductor 137 around the relay contacts 66 and 68 to the heating section 28 so that the heat circuit including the heating section 28 will be continuously connected to the cycling second step switch 54, 56. The circuit including the heating section 24 remains connected through the first step switch 44 to the supply conductor $L_1$ as long as the thermostat bulb 34 is below the temperature for which the knob 94 is set. The two circuits together provide a maximum heating rate of 2050 watts.

When the thermostat bulb 34 reaches the temperature for which the knob 94 is set, the diaphragm 30 and its follower 42 will open the contact member 44 to deenergize the circuit including the section 24. This will leave the sections 28 and 26 connected in series through the shunting switch contact 131 and the second step cycling switch member 54 with the supply conductor $L_1$ to provide a maximum input of 1070 watts. If this heat is not sufficient to maintain the selected temperature, the switch member 44 will close. If this heat is more than enough to maintain the selected temperature, then the diaphragm 30 will expand sufficiently upon a rise of 25° above the selected temperature to cause the second follower 52 to engage the switch member 54 to deenergize the heater sections 28 and 26 until the temperature is reduced. If the knob 94 is set at 205° the switch 54 will open and later reclose at approximately 230° to limit the temperature sufficiently to prevent burning of food within the receptacle 151 in the event this receptacle should boil dry.

While the form of embodiment of the invention as herein disclosed constitutes a preferred form, it is to be understood that other forms might be adopted as may come within the scope of the claims which follow.

What is claimed is as follows:

1. An electrical heating system for heating receptacles on the top of a support including an electrical surface heating means having three sections connected in a Y connection, power supply conductors, an adjustable two step thermostat substantially responsive to the temperature of any receptacle upon said surface heating means, said thermostat having successively operating first and second step switches having an increment in temperature between the operation of said first and second step switches and also having means for adjusting the temperatures at which said first and second step switches are operated, one of said sections being connected to the first supply conductor, a second of said sections being connected through the first step switch of said thermostat to the second power supply conductor, a thermal switch means having a series connected electric heater associated with it to cause intermittent opening and closing connected to the third of said sections, the second step switch of said thermostat being connected to said thermal switch means and said second supply conductor.

2. An electrical heating system for heating receptacles on the top of a support including an electrical surface heating means having three sections connected in a Y connection, power supply conductors, an adjustable two step thermostat substantially responsive to the temperature of any receptacle upon said surface heating means, said thermostat having successively operating first and second step switches having an increment in temperature between the operation of said first and second step switches and also having means for adjusting the temperatures at which said first and second step switches are operated, one of said sections being connected to the first supply conductor, a second of said sections being connected through the first step switch of said thermostat to the second power supply conductor, a thermal switch means having a series connected electric heater associated with it to cause intermittent opening and closing connected to the third of said sections, the second step switch of said thermostat being connected to said thermal switch means and said second supply conductor, an adjusting means for adjusting said thermostat from the low to high temperature range, and means operable when said adjusting means is in the upper portion of said temperature range for shunting said thermal switch means.

3. An electrical heating system for heating receptacles on the top of a support including an electric surface heating means having connected sections, and terminals at the ends of the sections, power supply conductors, an adjustable two step thermostat substantially responsive to the temperature of any receptacle upon said surface heating means, said thermostat having successively operating first and second step switches having an increment in temperature between the operation of said first and second step switches and also having means for adjusting the temperatures at which said first and second step switches are operated, a first of said terminals being connected to a first supply conductor, the second of said terminals being connected through the first step switch to the second supply conductor, a thermal switch means having a series connected electric heater associated with it to cause intermittent opening and closing connected to a third of said terminals, said thermal switch means being connected through said second step switch to said second supply conductor.

4. An electrical heating system for heating receptacles on the top of a support including an electric surface heating means having connected sections and terminals at the ends of the sections, power supply conductors, an adjustable two step thermostat substantially responsive to the temperature of any receptacle upon said surface heating means, said thermostat having successively operating first and second step switches having an increment in temperature between the operation of said first and second step switches and also having means for adjusting the temperatures at which said first and second step switches are operated, a first of said terminals being connected to a first supply conductor, the second of said terminals being connected through the first step switch to the second supply conductor, a thermal switch means having a series connected electric heater associated with it to cause intermittent opening and closing connected to a third of said terminals, said thermal switch being connected through said second step switch to said second supply conductor, an adjusting means for adjusting said thermostat from the low to high temperature range, and means operable coincidentally with said adjusting means only when said adjusting means is in the upper portion of said temperature range for shunting said thermal switch means.

5. An electrical heating system for heating receptacles on the top of a support including an electric surface heating means having connected sections and terminals at the ends of the sections, power supply conductors, an adjustable two step thermostat substantially responsive to the temperature of any receptacle upon said surface heating means, said thermostat having successively operating first and second step switches, the first terminal being connected to a first supply conductor, the second terminal being connected through the first step switch to the second supply conductor, a pulsing thermal switch means having a series connected electric heater associated with it to cause intermittent opening and closing, the third terminal being connected through said thermal switch means and said heater and said second step switch to said second supply conductor, an adjusting means for adjusting said thermostat from the low to high temperature range, and means operable when said adjusting means is in the upper portion of said temperature range for shunting said thermal switch means, said adjusting means having an off position and means effective in the off position for disconnecting said first terminal from said first supply conductor.

References Cited in the file of this patent

UNITED STATES PATENTS

| 2,137,073 | Bletz | Nov. 15, 1938 |
| 2,179,782 | Frankel et al. | Nov. 14, 1939 |
| 2,302,603 | Davis et al. | Nov. 17, 1942 |
| 2,399,423 | Bletz | Apr. 30, 1946 |
| 2,403,824 | Newell | July 9, 1946 |
| 2,409,414 | Bletz | Oct. 15, 1946 |
| 2,451,576 | Pearce | Oct. 19, 1948 |
| 2,712,055 | Campbell | June 28, 1955 |